United States Patent

Higuchi et al.

(10) Patent No.: US 10,562,411 B2
(45) Date of Patent: Feb. 18, 2020

(54) SLIDING DEVICE

(71) Applicant: TOYOTA BOSHOKU KABUSHIKI KAISHA, Aichi (JP)

(72) Inventors: Tadasuke Higuchi, Aichi (JP); Naoaki Hoshihara, Aichi (JP); Yoichi Takada, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/983,567

(22) Filed: May 18, 2018

(65) Prior Publication Data

US 2018/0334054 A1 Nov. 22, 2018

(30) Foreign Application Priority Data

May 19, 2017 (JP) .................. 2017-100212

(51) Int. Cl.
*B60N 2/02* (2006.01)
*B60N 2/06* (2006.01)
*F16H 1/20* (2006.01)
*F16H 19/04* (2006.01)
*B60N 2/08* (2006.01)
*F16H 1/08* (2006.01)

(52) U.S. Cl.
CPC ............. *B60N 2/0232* (2013.01); *B60N 2/06* (2013.01); *B60N 2/067* (2013.01); *B60N 2/0825* (2013.01); *B60N 2/0843* (2013.01); *F16H 1/20* (2013.01); *F16H 19/04* (2013.01); *B60N 2002/0236* (2013.01); *F16H 1/08* (2013.01)

(58) Field of Classification Search
CPC .... B60N 2/0232; B60N 2/067; B60N 2/0843; B60N 2/0825; B60N 2/06; B60N 2002/0236; F16H 1/20; F16H 19/04
USPC .................................. 248/424, 425, 429, 430
See application file for complete search history.

(56) References Cited

U.S. PATENT DOCUMENTS

| | | | | | |
|---|---|---|---|---|---|
| 1,759,922 | A | * | 5/1930 | Templeton | B60N 2/1821 248/393 |
| 3,105,668 | A | * | 10/1963 | Pickles | B60N 2/0248 248/394 |
| 2015/0289665 | A1 | * | 10/2015 | Klimm | F16H 19/04 74/89.14 |
| 2017/0184151 | A1 | * | 6/2017 | Huang | F16C 29/008 |
| 2017/0368962 | A1 | * | 12/2017 | Auer | B60N 2/0727 |
| 2018/0065507 | A1 | * | 3/2018 | Napau | B60N 2/0232 |
| 2018/0251043 | A1 | * | 9/2018 | Falster | F16H 1/16 |
| 2019/0093738 | A1 | * | 3/2019 | Almqvist | B25H 1/0064 |

FOREIGN PATENT DOCUMENTS

JP H05-028739 4/1993

* cited by examiner

*Primary Examiner* — Muhammad Ijaz
(74) *Attorney, Agent, or Firm* — Greenblum & Bernstein, P.L.C.

(57) ABSTRACT

Provided is a sliding device. The sliding device includes a fixed rail, a movable rail, a rack, a pinion, a locking mechanism that restricts sliding of the movable rail, and a gear mechanism. The gear mechanism includes multiple gears and transmits a rotation generated in an electric motor to the pinion. The gear mechanism is configured such that the pinion is capable of rotating more than a specified angle of rotation when the electric motor is in a stopped state.

5 Claims, 9 Drawing Sheets

SLIDING DEVICE

CROSS-REFERENCE TO RELATED APPLICATIONS

This application claims the benefit of Japanese Patent Application No. 2017-100212 filed on May 19, 2017 with the Japan Patent Office, the entire disclosure of which is incorporated herein by reference.

BACKGROUND

The present disclosure relates to a sliding device that supports a vehicle seat in a slidable manner.

For example, a sliding device disclosed in Unexamined Japanese Utility Model Application Publication H5-28739 (Patent Document 1) comprises a rack fixed to a fixed rail, a movable rail comprising a pinion meshed with the rack, and an electric motor for rotating the pinion.

In the sliding device of Patent Document 1, rotation of the electric motor is transmitted to the pinion via an irreversible deceleration mechanism. The irreversible deceleration mechanism is a gear mechanism that restricts transmission of the rotation from the pinion to the electric motor.

In other words, the sliding device of Patent Document 1 is configured such that, when the electric motor is in a stopped state, rotation of the pinion is restricted (prohibited) by the irreversible deceleration mechanism, and sliding of the vehicle seat is thereby restricted.

SUMMARY

In the sliding device of Patent Document 1, sliding of the vehicle seat is restricted by restriction of rotation of the pinion; thus, the load acting on the vehicle seat acts on the pinion and the rack. Thus, in the sliding device of Patent Document 1, the pinion and the rack have to be designed to be larger due to such a large load acting on the pinion and the rack.

In one aspect of the present disclosure, it is desirable to provide a sliding device in which the pinion and the rack can be inhibited from being subjected to a large load.

A sliding device according to the present disclosure supports a vehicle seat in a slidable manner. The sliding device comprises: a fixed rail; a movable rail onto which the vehicle seat is fixed, the movable rail being slidable with respect to the fixed rail; a rack fixed to the fixed rail, the rack extending parallel to a longitudinal axis of the fixed rail; a pinion meshed with the rack, the pinion being supported by the movable rail; a locking mechanism that restricts sliding of the movable rail, the locking mechanism comprising an engaging portion that is displaced between a locking position in which the engaging portion engages with an engaged portion provided to the fixed rail, and a non-locking position in which the engaging portion is spaced apart from the engaged portion; and a gear mechanism comprising multiple gears and transmitting a rotation generated in an electric motor to the pinion, the pinion being capable of rotating more than a specified angle of rotation when the electric motor is in a stopped state.

Due to such a configuration, when the electric motor is in the stopped state, the load acting on the vehicle seat can be received by the locking mechanism.

Further, since the pinion is capable of rotating more than the specified angle of rotation when the electric motor is in the stopped state, the engaging portion and the engaged portion can be reliably engaged with each other when the electric motor has stopped.

For example, complete engagement between the engaging portion and the engaged portion may not be established in some cases depending on a position of the movable rail at the time the electric motor has stopped.

However, in this sliding device, the pinion can rotate more than the angle of rotation when the electric motor is in the stopped state; thus, the movable rail can slide to a position where the complete engagement between the engaging portion and the engaged portion is established.

Accordingly, it is possible to obtain a sliding device in which the engaging portion and the engaged portion can be reliably engaged with each other when the electric motor has stopped and in which the pinion and the rack can be inhibited from being subjected to a large load.

The sliding device may be configured as below. Specifically, it is desirable that, among the multiple gears, a first gear and a second gear meshed with each other each have a tooth-trace direction tilted with respect to a corresponding rotation center axis, that the first gear is positioned closer to the electric motor than the second gear in a rotational force transmission path, and that a tilt angle of each tooth-trace direction with respect to the corresponding rotation center axis is an angle enabling the first gear to rotate when the second gear rotates.

Due to such a configuration, the above-described actions and effects can be obtained easily by setting the tilt angles of the tooth-trace directions as appropriate.

It is desirable that the first gear is a screw gear-shaped worm and that the second gear is a helical gear-shaped worm wheel meshed with the worm. This makes it possible to obtain the above-described actions and effects with a simple configuration.

It is desirable that the first gear is coupled to an output shaft of the electric motor. This makes it possible to ensure quietness and also to obtain the above-described actions and effects easily.

It is desirable that the rack is fixed within the fixed rail such that a tooth surface faces the movable rail. This can reduce the necessity of designing the sliding device to be larger.

BRIEF DESCRIPTION OF THE DRAWINGS

An embodiment of the present disclosure will be described below by way of example with reference to the accompanying drawings, in which.

DETAILED DESCRIPTION OF THE PREFERRED EMBODIMENTS

Figure 1:
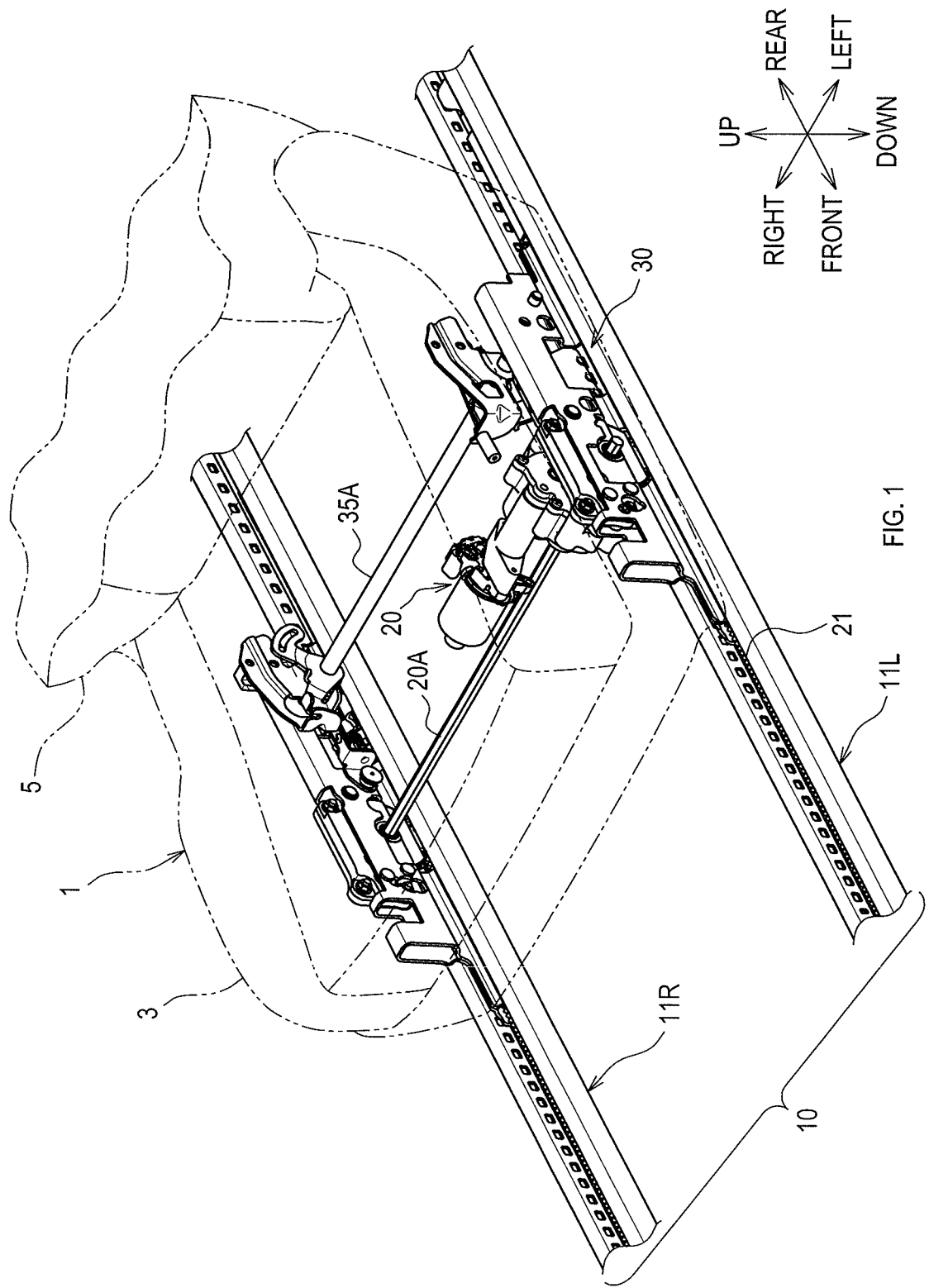
FIG. 1 is a diagram showing a sliding device according to the embodiment.

"Embodiments" to be described below are example embodiments within the technical scope of the present disclosure. In other words, invention-specifying-matters and so on recited in the accompanying claims are not limited to specific configurations, structures, and the like, shown in the below-described embodiments.

Arrows or the like indicating directions shown in the drawings are provided for easy understanding of mutual relationships between the drawings. The scope of the present disclosure is not limited by the arrows or the like (directions) shown in the drawings.

In the descriptions below, an "occupant" refers to a crew member in a vehicle and/or a person who uses a vehicle seat.

1. Overview of Vehicle Seat and Relevant Components

In the present disclosure, an example of a sliding device for a vehicle seat will be described. A vehicle seat 1 shown in FIG. 1 comprises a seat cushion 3 and a seatback 5. The seat cushion 3 supports the buttocks of the occupant. The seatback 5 supports the back of the occupant.

Figure 2:
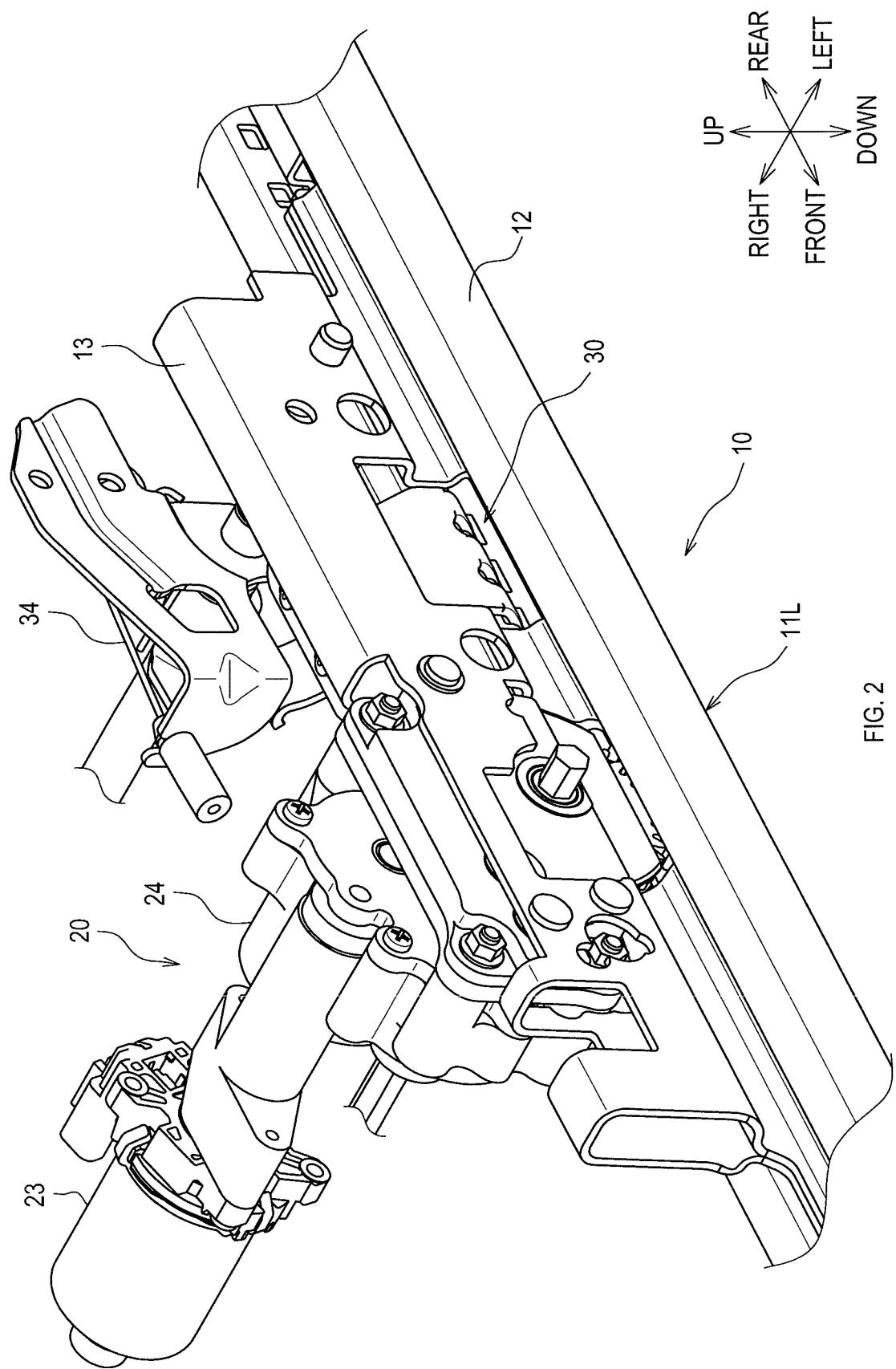
FIG. 2 is a diagram showing a drive unit for the sliding device according to the embodiment.

A sliding device 10 supports the vehicle seat 1 in a slidable manner. The sliding device 10 comprises a left rail unit 11L, a right rail unit 11R, a drive unit 20 (see FIG. 2 for details), a locking mechanism 30, a lever linking shaft 35A, and a drive unit linking shaft 20A.

The left rail unit 11L supports the left side of the vehicle seat 1. The right rail unit 11R supports the right side of the vehicle seat 1.

The drive unit 20 exerts a driving force that slidingly displaces the vehicle seat 1. The locking mechanism 30 restricts sliding displacement of the vehicle seat 1. In the present embodiment, the drive unit 20 and the locking mechanism 30 operate in an electrically or mechanically linked manner.

2. Configuration of Sliding Device

The left rail unit 11L and the right rail unit 11R are symmetrically positioned on left and right sides of the vehicle seat 1 respectively, and may be mirror images. The configuration of the sliding device 10 of the present embodiment will be described below taking the left rail unit 11L as an example.

<Rail Unit>

Figure 3:
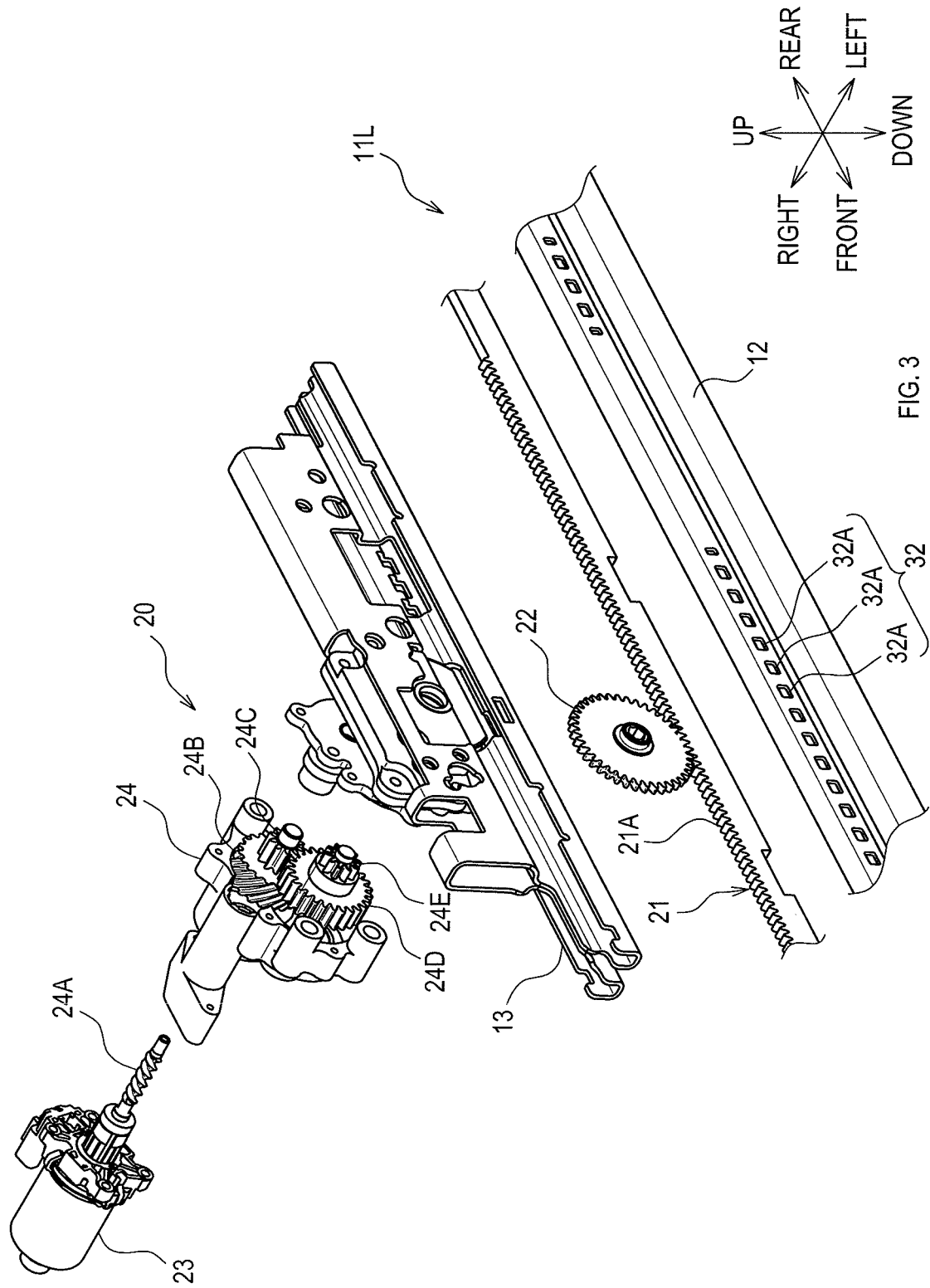
FIG. 3 is a diagram showing the drive unit, a gear mechanism, and so on for the sliding device according to the embodiment.

As shown in FIG. 3, the left rail unit 11L comprises a fixed rail 12 and a movable rail 13. The fixed rail 12 is a rail member fixed to a vehicle directly or indirectly. The movable rail 13 is a member supported by the fixed rail 12 in a manner slidable with respect to the fixed rail 12.

The vehicle seat 1 is fixed onto the movable rail 13. Specifically, a cushion frame (not shown) of the vehicle seat 1 is directly or indirectly coupled to an upper side of the movable rail 13.

<Drive Unit>

Figure 4:
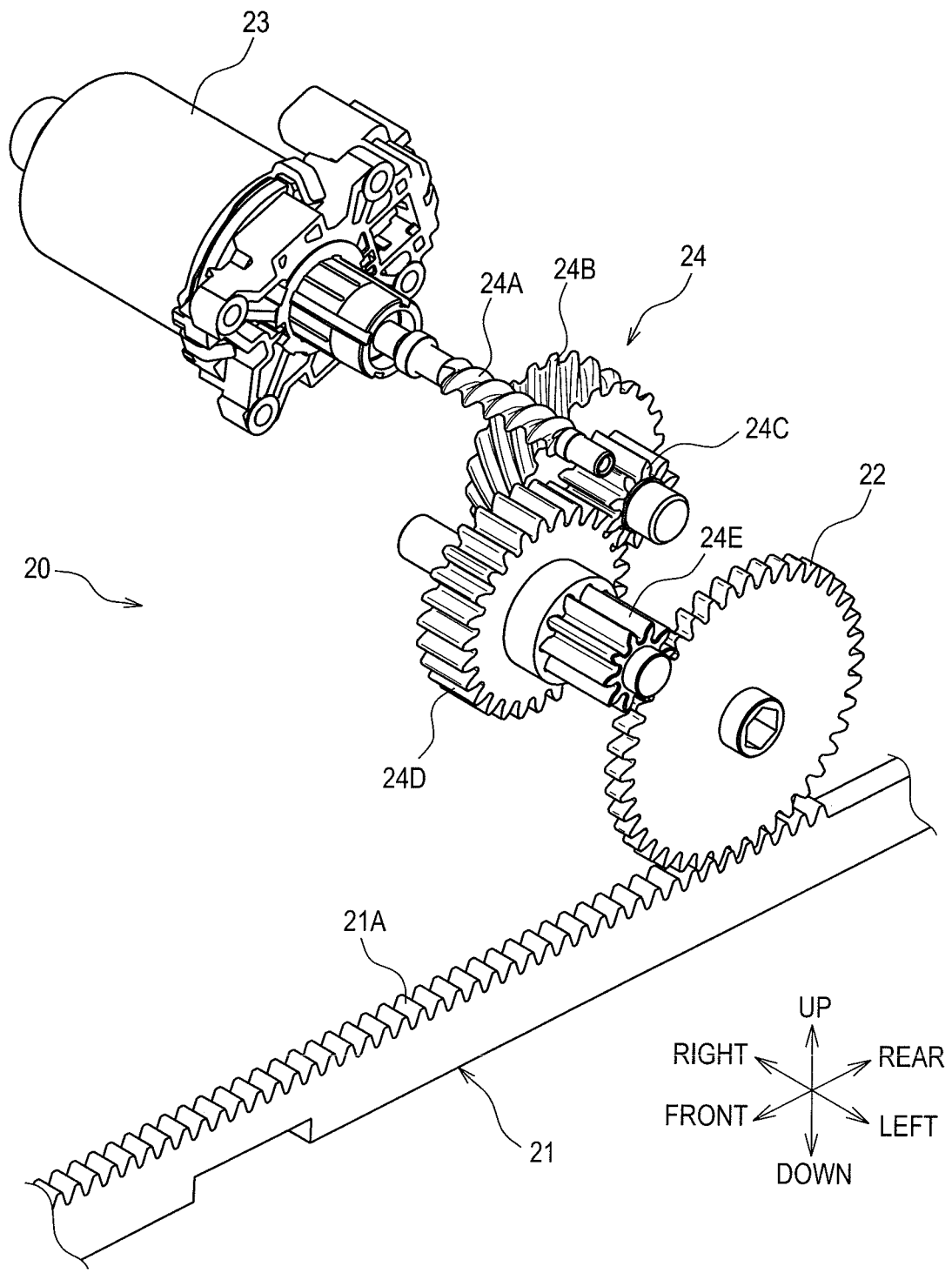
FIG. 4 is a diagram showing the gear mechanism according to the embodiment.

The drive unit 20 comprises a rack 21, a pinion 22, an electric motor 23, and a gear mechanism 24. As shown in FIG. 4, the rack 21 is a flat-plate-like member comprising a toothed portion 21A at an upper end face thereof and extending parallel to a longitudinal axis (front-rear axis) of the fixed rail 12.

Figure 6:
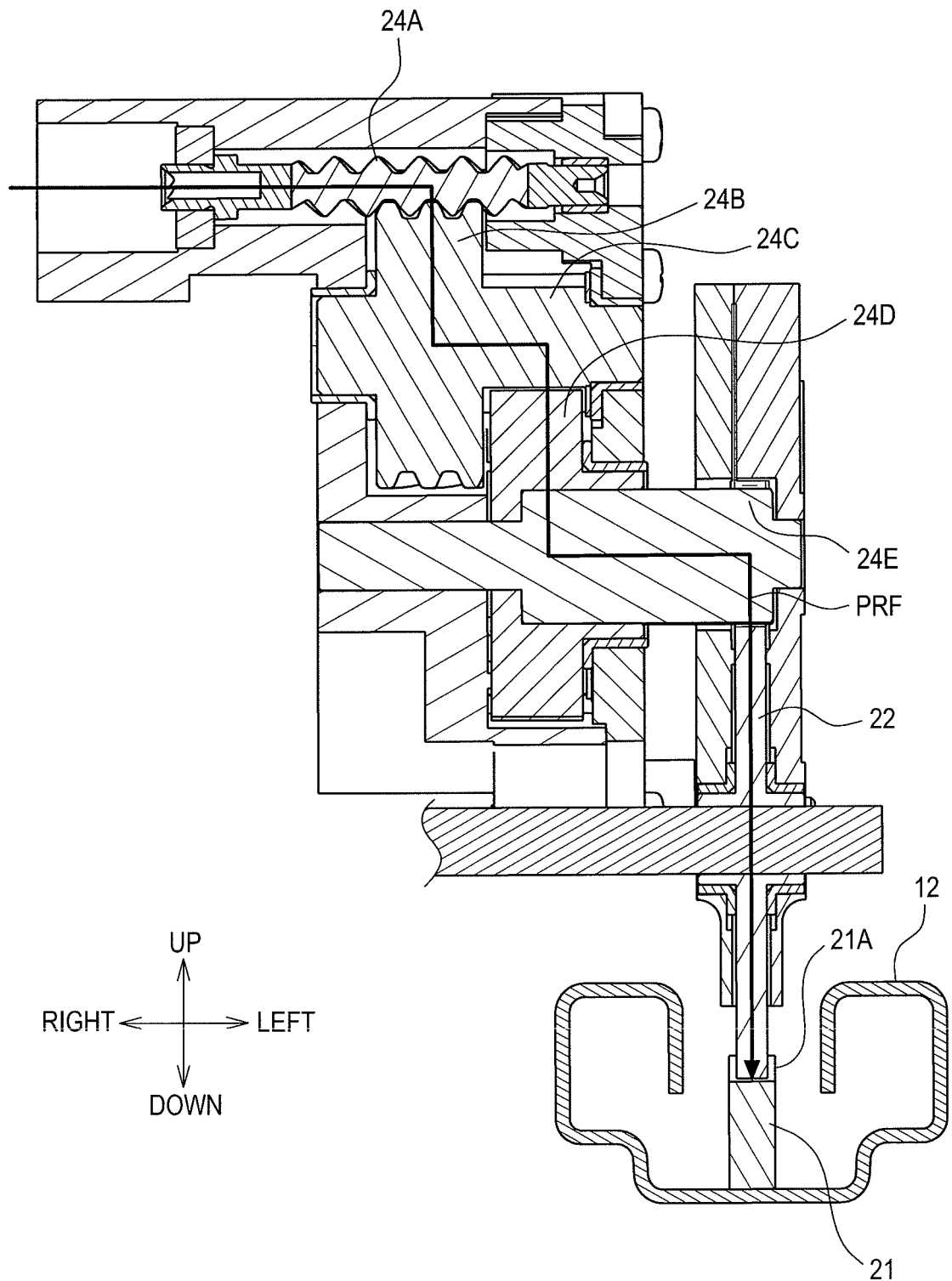
FIG. 6 is a diagram showing the gear mechanism according to the embodiment.

The rack 21 is fixed to the fixed rail 12, or may be integral with the fixed rail 12. Specifically, as shown in FIG. 6, the rack 21 is fixed within the fixed rail 12 such that the toothed portion 21A faces the movable rail 13. In other words, the rack 21 is fixed within the fixed rail 12 with the toothed portion 21A directed upward. Also see FIGS. 3 and 4.

The pinion 22 is a gear meshed with the rack 21. The pinion 22 is directly or indirectly supported by the movable rail 13 in a rotatable manner. In other words, the pinion 22 and the movable rail 13 are displaced integrally.

Figure 5:
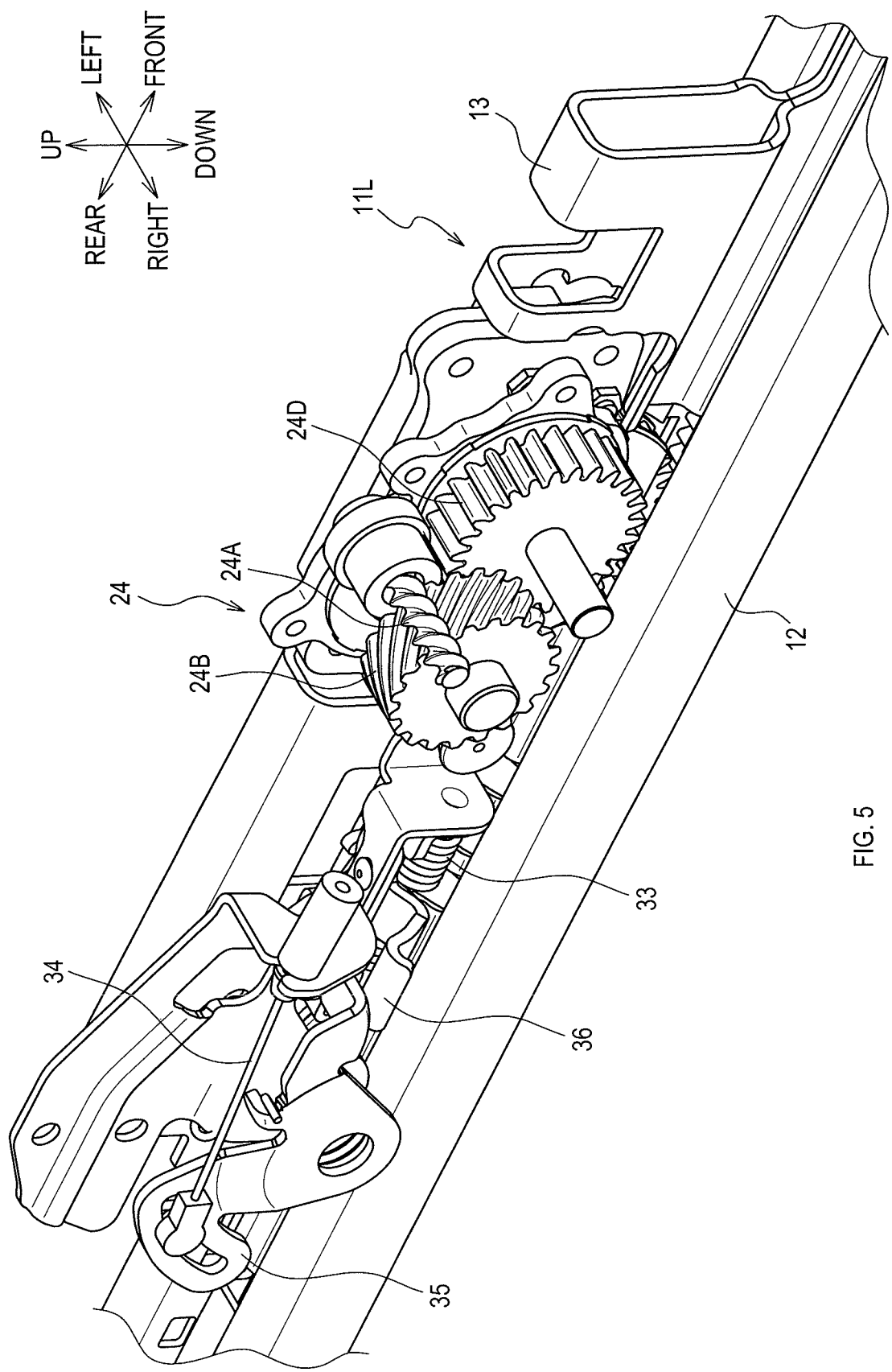
FIG. 5 is a diagram showing the gear mechanism according to the embodiment.

The electric motor 23 exerts a rotational driving force that rotates the pinion 22. The gear mechanism 24 transmits a rotation generated in the electric motor 23 to the pinion 22. As shown in FIGS. 4 to 6, the gear mechanism 24 is configured with gears 24A to 24E.

As shown in FIG. 6, the rotational force generated in the electric motor 23 is transmitted to the gear 24A, the gear 24B, the gear 24C, the gear 24D, the gear 24E, and the pinion 22 in this order. At this time, the gear mechanism 24 decelerates the rotation generated in the electric motor 23 and transmits the decelerated rotation to the pinion 22. Thus, an angle of rotation of the electric motor 23 (and of the gear 24A) is larger than an angle of rotation of the pinion 22.

The gear mechanism 24 is configured such that, when the electric motor 23 is in the stopped state, the pinion 22 can rotate more than a specified angle of rotation (hereinafter referred to as an adjustment angle). In other words, the gear mechanism 24 is configured with a reversible deceleration mechanism.

Specifically, the gear mechanism 24 is configured as below. As shown in FIGS. 4 and 5, the gear 24A (hereinafter referred to as a first gear 24A) and the gear 24B (hereinafter referred to as a second gear 24B), which are in mesh with each other among the gears 24A to 24E, each have a tooth-trace direction tilted with respect to a rotation center axis thereof.

Figure 7:
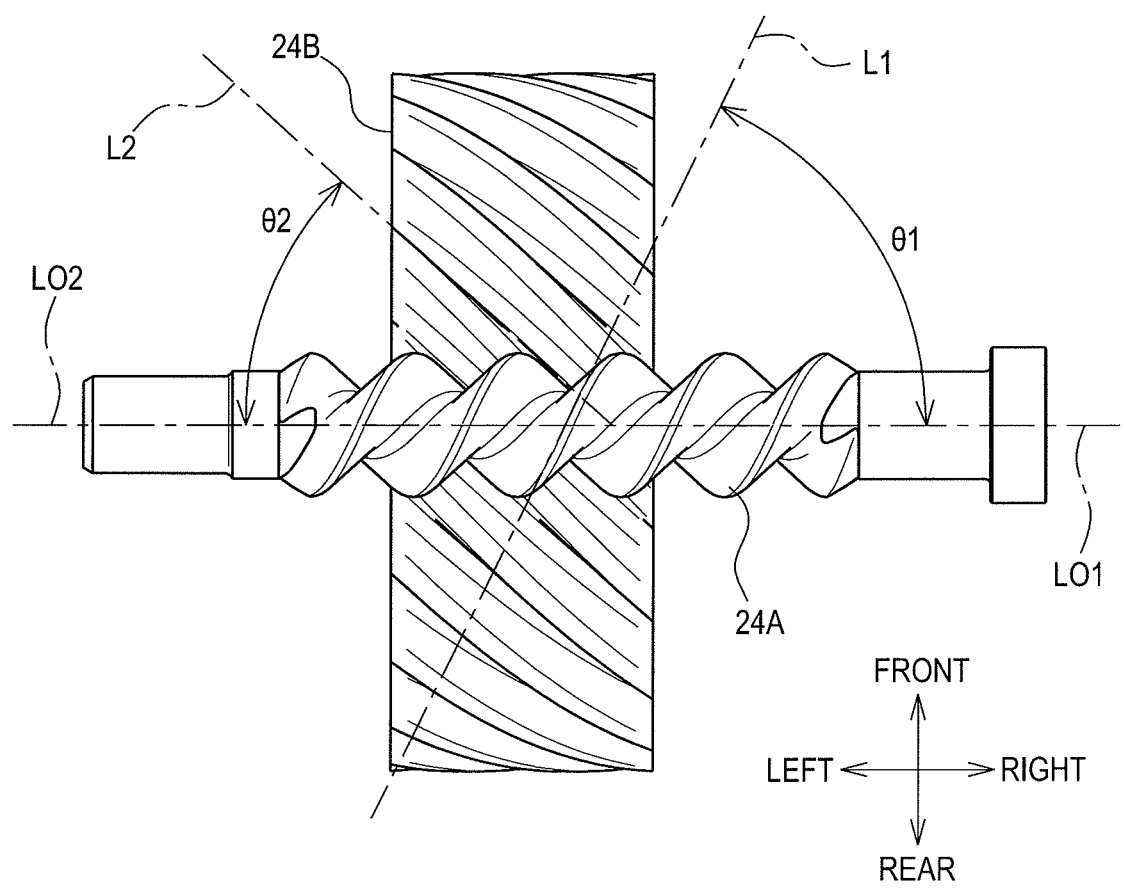
FIG. 7 is a diagram showing a first gear and a second gear according to the embodiment.

As shown in FIG. 7, the tooth-trace direction of the first gear 24A means a ridge direction L1, in which a top of a tooth of the first gear 24A extends. The tooth-trace direction of the second gear 24B means a ridge direction L2, in which a top of a tooth of the second gear 24B extends. An imaginary line LO1 is a rotation center axis of the first gear 24A. An imaginary line LO2 is a rotation center axis of the second gear 24B.

The first gear 24A of the present embodiment is a screw gear-shaped worm. The second gear 24B is a helical gear-shaped worm wheel meshed with the worm. The first gear 24A is coupled to an output shaft of the electric motor 23 (see FIG. 4).

Thus, the rotation center axis LO1 of the first gear 24A corresponds to a central axis of the output shaft of the electric motor 23. The rotation center axis LO2 of the second gear 24B is parallel to the rotation center axis LO1 of the first gear 24A.

In a rotational force transmission path PRF (also known as a torque transmission path) shown in FIG. 6, the first gear 24A is positioned closer to the electric motor 23 than the second gear 24B. Tilt angles θ1 and θ2 are set so as to enable the first gear 24A to rotate when the second gear 24B rotates.

The tilt angle θ1 refers to an angle of the tooth-trace direction L1 with respect to the rotation center axis LO1. The tilt angle θ2 refers to an angle of the tooth-trace direction L2 with respect to the rotation center axis LO2. The first gear 24A and the second gear 24B are gears in mesh with each other. Thus, the tilt angle θ2 is an angle to be determined self-evidently upon determination of the tilt angle θ1.

The tilt angle θ1 is determined as appropriate in accordance with the following technical idea. First, a state in which the pinion 22 rotates more than the adjustment angle when the electric motor 23 is in the stopped state means a state in which the rotation of the second gear 24B is transmitted to the first gear 24A to thereby rotate the first gear 24A.

The force to rotate the first gear 24A is a component force in a thrust direction (along the rotation center axis LO1), among forces generated at a portion where a tooth surface of the first gear 24A and a tooth surface of the second gear 24B are in contact with each other when the second gear 24B rotates.

Thus, as the tilt angle $\theta 1$ is increased to make the tooth-trace direction L1 of the first gear 24A closer to a radial direction (a direction perpendicular to the rotation center axis LO1), the force to rotate the first gear 24A (hereinafter referred to as a reverse rotational force) is decreased.

The state in which the first gear 24A rotates is a "state in which the magnitude of the reverse rotational force has become larger than a rotational resistance in a stationary state of the first gear 24A". The tilt angle $\theta 1$ at the time the magnitude of the reverse rotational force is equal to the rotational resistance in the stationary state of the first gear 24A is hereinafter referred to as a critical angle $\theta c$.

Thus, when the tilt angle $\theta 1$ is larger than or equal to the critical angle $\theta c$, the first gear 24A does not rotate. In other words, the gear mechanism 24 whose tilt angle $\theta 1$ is larger than or equal to the critical angle $\theta c$ is an irreversible deceleration mechanism. The gear mechanism 24 whose tilt angle $\theta 1$ is smaller than the critical angle $\theta c$ is a reversible deceleration mechanism. That is, the tilt angle $\theta 1$ of the gear mechanism 24 of the present embodiment is a specified angle smaller than the critical angle $\theta c$.

<Locking Mechanism>

Figure 9:
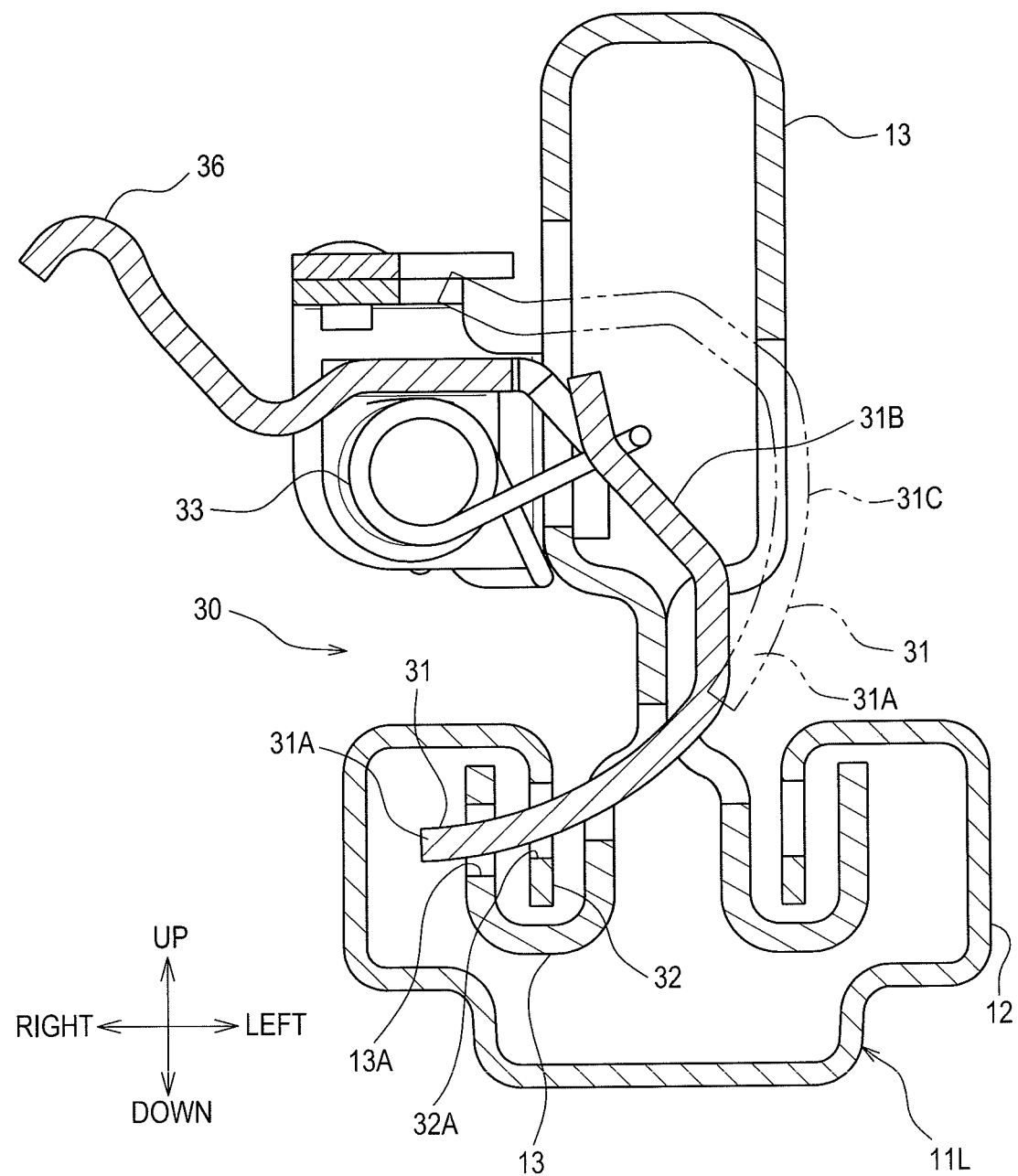
FIG. 9 is a diagram showing the locking mechanism according to the embodiment.

The locking mechanism 30 restricts sliding of the movable rail 13 to thereby restrict the sliding displacement of the vehicle seat 1. As shown in FIG. 9, the locking mechanism 30 comprises an engaging portion 31 that locks the movable rail 13 to the fixed rail 12, when in locking position.

The engaging portion 31 is displaced between the locking position 31B (a position shown in solid lines, in which the engaging portion 31 engages with an engaged portion 32 provided to the fixed rail 12), and a non-locking position 31C (a position shown in two-dot chain lines, in which the engaging portion 31 is spaced apart from the engaged portion 32).

Figure 8:
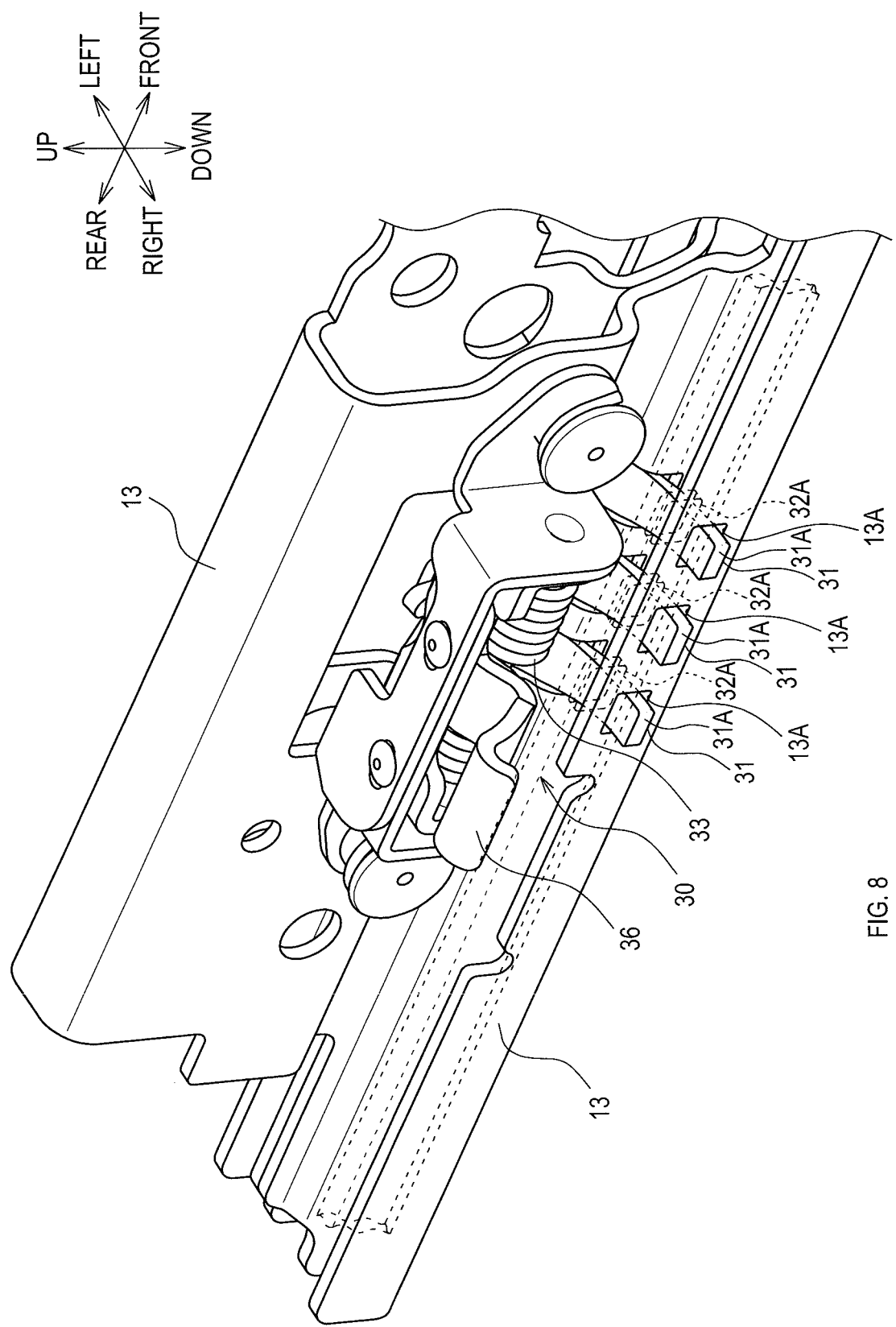
FIG. 8 is a diagram showing a locking mechanism according to the embodiment.

The engaged portion 32 is configured with at least two through-holes 32A provided in the fixed rail 12. As shown in FIG. 3, these through-holes are lined in series along the longitudinal axis of the fixed rail 12. As shown in FIG. 8, the engaging portion 31 is configured with a claw 31A of a protrusion-like shape that passes through the engaged portion 32.

The claw 31A is at least one (three, in the present embodiment) in number. As shown in FIG. 9, when the claws 31A constituting the engaging portions 31 are inserted into some of the through-holes 32A constituting the engaged portion 32, the claws 31A are also inserted into through-holes 13A arranged in the movable rail 13. One through-hole 13A permanently corresponds with (and moves longitudinally with) one claw 31A.

A spring 33 exerts an elastic force that tends to keep the engaging portion 31 in the locking position, and that tends to displace the engaging portion 31 from the non-locking position toward the locking position. When a control cable 34 (see FIG. 5) is pulled, a first operating lever 35 (see FIG. 5) is pivotally displaced in a first direction.

When the first operating lever 35 is pivotally displaced in the first direction, an operation force acts (downwardly) on a second operating lever 36 (see FIG. 9), thereby displacing the engaging portion 31 from the locking position 31B to the non-locking position 31C and increasing an amount of elastic deformation of the spring 33 (by pushing against the spring 33).

When the control cable 34 is released and returns, the downward operation force is no longer exerted upon the second operating lever 36; thus, the elastic force of the spring 33 displaces the engaging portion 31 from the non-locking position 31C toward the locking position 31B. The control cable 34 is operated by an electrical actuator (not shown).

3. Operation and Characteristics of Sliding Device

For example, the locking mechanism 30 and the drive unit 20 operate in a linked manner as below. Specifically, when a slide switch (not shown) is operated by the occupant to give a command to slide the vehicle seat 1, the above-described actuator operates first, and the engaging portion 31 is displaced to the non-locking position 31C to produce a slidable state.

When the slidable state is produced, then the electric motor 23 starts rotating, and the vehicle seat 1 is slidingly displaced along a front-rear axis thereof. When the slide switch is turned off, the electric motor 23 stops first.

After the electric motor 23 stops, the above-described actuator operates and the control cable 34 returns. In this way, the engaging portion 31 is displaced from the non-locking position toward the locking position due to the elastic force of the spring 33.

At this time, complete engagement (locking) between the engaging portion 31 and the engaged portion 32 may not be established in some cases depending on a position of the movable rail 13 at the time the electric motor 23 has stopped. The complete engagement between the engaging portion 31 and the engaged portion 32 means a state in which the claw 31A (or claws 31A) of the engaging portion 31 is inserted into one of the through-holes 32A of the engaged portion 32 (see FIG. 8).

However, in the present embodiment, the pinion 22 can rotate more than an adjustment angle when the electric motor 23 is in the stopped state (because $\theta 1 < \theta c$, such that the electric motor 23 can be rotated by rotating the pinion). Thus, the movable rail 13 can slide (slightly forwards or slightly backwards) to a position where the complete engagement between the engaging portion 31 and the engaged portion 32 is established.

Accordingly, it is possible to obtain a sliding device in which the engaging portion 31 and the engaged portion 32 can be reliably engaged with each other after the electric motor 23 has stopped. Thus, the pinion 22 and the rack 21 can be inhibited (by the locking mechanism 30) from being subjected to a large load.

As evidenced by the explanation of the operation so far, the above-described adjustment angle is a specified angle larger than or equal to an angle of rotation corresponding to a pitch dimension between the through-holes constituting the engaged portions 32.

In the present embodiment, when the electric motor 23 is in the stopped state, the load acting on the vehicle seat 1 can be received by the locking mechanism 30. Thus, even when the gear mechanism 24 is a reversible deceleration mechanism (when $\theta 1 < \theta c$), sliding of the vehicle seat 1 can be restricted. It is preferable that the gear mechanism 24 is a reversible deceleration mechanism.

Since it is sufficient for the pinion 22 and the rack 21 to have a strength required to allow the vehicle seat 1 to slide (to a desired position as the motor rotates), the necessity of designing the pinion 22 and the rack 21 to be larger can be reduced. This enables the rack 21 to be easily housed within the fixed rail 12.

The first gear 24A is a screw gear-shaped worm, and the second gear 24B is a helical gear-shaped worm wheel meshed with the worm. Thus, the rotation center axes of the worm and the worm wheel are parallel to each other, thereby making it possible to obtain the above-described actions and effects with a simple configuration.

The first gear 24A is coupled to the output shaft of the electric motor 23. Thus, it is the first gear 24A that rotates at the highest (rotational) speed when the vehicle seat 1 slides. Accordingly, use of gears each having a helical tooth trace as the first gear 24A and the second gear 24B makes it possible to ensure quietness and also to obtain the above-described actions and effects easily.

In the present embodiment, spur gears whose tooth-trace directions are parallel to the rotation center axes thereof are used as the gears 24C to 24E in order to reduce decrease in the transmission efficiency of the rotational force of the gear mechanism 24. The helical gears are advantageous in terms of quietness.

Other Embodiments

In the above-described embodiment, the first gear 24A is the screw gear-shaped worm, and the second gear 24B is the helical gear-shaped worm wheel meshed with the worm. However, the present disclosure is not limited to this.

In the above-described embodiment, the first gear 24A is coupled to the output shaft of the electric motor 23. However, the present disclosure is not limited to this. For example, the first gear 24A may be configured with any of the gears 24B to 24E.

The gears 24C to 24E of the above-described embodiment are spur gears. However, the present disclosure is not limited to this. For example, the gears 24C to 24E may be configured with helical gears.

The locking mechanism 30 of the above-described embodiment is configured such that the claws 31A constituting the engaging portions 31 are inserted into the through-holes 32A constituting the engaged portion 32. However, the present disclosure is not limited to this.

The rack 21 of the above-described embodiment is fixed within the fixed rail 12 such that the tooth surface upwardly faces the movable rail 13. However, the present disclosure is not limited to this. For example, the rack 21 may be fixed outside the fixed rail 12 such that the tooth tops of the rack 21 correspond to the width direction (and face sideways).

The rack 21 of the above-described embodiment is directly fixed to (or is integral with) the fixed rail 12. However, the present disclosure is not limited to this. For example, a configuration may be adopted in which the rack 21 is separately fixed to a portion where the fixed rail 12 is fixed (e.g., to a vehicle floor panel), that is, in which the rack 21 is indirectly fixed to the fixed rail 12 (through the floor panel).

In the above-described embodiment, the present disclosure is applied to an automobile seat. However, the present disclosure is not limited to this. The present disclosure can also be applied to seats for use in other vehicles, such as railway vehicles, ships, and airplanes, and to stationary seats used at theaters, homes, and so on.

Further, the present disclosure is not limited to the above-described embodiments as long as the present disclosure conforms to the gist of the invention recited in the accompanying claims. Thus, at least two of the above-described embodiments may be combined together.

What is claimed is:

1. A sliding device that supports a vehicle seat in a slidable manner, the sliding device comprising:
    a fixed rail;
    a movable rail onto which the vehicle seat is fixable, the movable rail being slidable with respect to the fixed rail;
    a rack fixed to the fixed rail, the rack extending parallel to a longitudinal axis of the fixed rail;
    a pinion meshed with the rack, the pinion being supported by the movable rail;
    a locking mechanism that restricts sliding of the movable rail, the locking mechanism comprising an engaging portion that is displaced between a locking position in which the engaging portion engages with an engaged portion provided within the fixed rail by passing through the engaged portion, and a non-locking position in which the engaging portion is spaced apart from the engaged portion; and
    a gear mechanism comprising multiple gears and transmitting a rotation generated in an electric motor to the pinion, the pinion being capable of rotating more than a specified angle of rotation when the electric motor is in a stopped state.

2. The sliding device according to claim 1,
    wherein, among the multiple gears, a first gear and a second gear meshed with each other each have a tooth-trace direction tilted with respect to a corresponding rotation center axis, the first gear being positioned closer to the electric motor than the second gear in a rotational force transmission path, and
    wherein a tilt angle of each tooth-trace direction with respect to the corresponding rotation center axis is an angle enabling the first gear to rotate when the second gear rotates.

3. The sliding device according to claim 2,
    wherein the first gear is a screw gear-shaped worm, and
    wherein the second gear is a helical gear-shaped worm wheel meshed with the worm.

4. The sliding device according to claim 3,
    wherein the first gear is coupled to an output shaft of the electric motor.

5. The sliding device according to claim 1,
    wherein the rack is fixed within the fixed rail such that a tooth surface faces the movable rail.

* * * * *